United States Patent
Su et al.

(10) Patent No.: US 10,943,131 B2
(45) Date of Patent: Mar. 9, 2021

(54) IMAGE BASED LANE MARKING CLASSIFICATION

(71) Applicant: Aptiv Technologies Limited, St. Michael (BB)

(72) Inventors: Yu Su, Wuppertal (DE); Andre Paus, Wuppertal (DE); Kun Zhao, Duisburg (DE); Mirko Meuter, Erkrath (DE); Christian Nunn, Huckeswagen (DE)

(73) Assignee: Aptiv Technologies Limited, St. Michael (BB)

( * ) Notice: Subject to any disclaimer, the term of this patent is extended or adjusted under 35 U.S.C. 154(b) by 54 days.

(21) Appl. No.: 16/409,035

(22) Filed: May 10, 2019

(65) Prior Publication Data

US 2019/0370566 A1     Dec. 5, 2019

(30) Foreign Application Priority Data

May 30, 2018   (EP) .................................. 18175134

(51) Int. Cl.
G06K 9/00   (2006.01)
B60W 30/12   (2020.01)

(52) U.S. Cl.
CPC ......... *G06K 9/00798* (2013.01); *B60W 30/12* (2013.01); *G06T 2207/30256* (2013.01)

(58) Field of Classification Search
CPC combination set(s) only.
See application file for complete search history.

(56) References Cited

U.S. PATENT DOCUMENTS

| 7,403,219 B2 | 7/2008 | Miyashita et al. |
| 9,047,518 B2 | 6/2015 | Nunn et al. |
| 2009/0167864 A1* | 7/2009 | Unoura ............... G06T 7/12 348/148 |
| 2011/0298602 A1* | 12/2011 | Chen ............... B60Q 9/008 340/435 |

(Continued)

OTHER PUBLICATIONS

Florin Oniga,Processing Dense Stereo Data Using Elevation Maps: Road Surface, Traffic Isle , and Obstacle Detection ,IEEE Transactions on Vehicular Technology, vol. 59, No. 3, Mar. 2010, pp. 1172-1178.*

(Continued)

*Primary Examiner* — Omar S Ismail
(74) *Attorney, Agent, or Firm* — Colby Nipper PLLC

(57) ABSTRACT

An image processing method includes: determining a candidate track in an image of a road, wherein the candidate track is modelled as a parameterized line or curve corresponding to a candidate lane marking in the image of a road; dividing the candidate track into a plurality of cells, each cell corresponding to a segment of the candidate track; determining at least one marklet for a plurality of said cells, wherein each marklet of a cell corresponds to a line or curve connecting left and right edges of the candidate lane marking; determining at least one local feature of each of said plurality of cells based on characteristics of said marklets; determining at least one global feature of the candidate track by aggregating the local features of the plurality of cells; and determining if the candidate lane marking represents a lane marking based on the at least one global feature.

20 Claims, 5 Drawing Sheets

(56) References Cited

U.S. PATENT DOCUMENTS

2012/0072080 A1* 3/2012 Jeromin .............. G06K 9/2018
                                                    701/49
2018/0285659 A1* 10/2018 Kwant ................. G06K 9/4633
2019/0035101 A1* 1/2019 Kwant ................. G06N 3/0454

OTHER PUBLICATIONS

Stephanie Hold et al: "ELA—An exit lane assistant for adaptive cruise control and navigation systems", Sep. 19, 2010, pp. 629-634.
Mirko Meuter et al: "A novel approach to lane detection and tracking", Oct. 4, 2009, pp. 1-6.
Collado, et al., "Detection and Classification of Road Lanes with a Frequency Analysis", Jul. 2005, 6 pages.
Ding, et al., "Various Lane Marking and Classification for Vision-based Navigation System", Mar. 2015, pp. 491-492, 2 pages.
Hoang, et al., "Road Lane Detection by Discriminating Dashed and Solid Road Lanes Using a Visible Light Camera Sensor", Aug. 2016, 23 pages.
Suchitra, et al., "Identifying Lane Types: A Modular Approach", Oct. 2013, pp. 1929-1934, 6 pages.

* cited by examiner

IMAGE BASED LANE MARKING CLASSIFICATION

TECHNICAL FIELD OF INVENTION

This disclosure generally relates to an image processing method for performing a lane classification based on an image of a road.

BACKGROUND OF INVENTION

Examples are known in the prior art wherein automatic self-driving vehicles are equipped with on-board cameras coupled to image processing modules, allowing to process camera images to obtain information about the surrounding environment.

For example, lane markings can be identified in camera images to issue a warning if the vehicle passes a lane boundary. Such a system represents a lane departure warning (LDW) system.

An important functionality of LDW systems is to detect the respective lane markings, identify their type (e.g. solid line or dashed line) and their valid range (e.g. visually perceived length).

For this purpose, prior art image processing methods convert an image of a road, as viewed from the perspective of a vehicle, to a bird-view image from which line segments of a lane marking are found by edge detection. Then, a lane type classification is performed by checking the connectivity of the line segments, in particular in relevant portions of the image, and/or by determining and analyzing the length of line segments in both the near and far image portions as viewed from the vehicle perspective.

Although intuitive, these methods can in many situations fail to correctly classify lane markings. For example, if a solid line is worn, damaged or occluded by dirt, skid marks or parts of another vehicle, a lacking connectivity of line segments may lead to an incorrect classification of a dashed line.

Similarly, a lane marking classifier must be able to distinguish a true lane marking from a false one, for example to avoid false classifications due to guardrails or curbs captured in the images. In prior art applications, a lane marking is usually modelled as a parameterized curve, for example as a line or a polynomial curve without length limitations. However, in practical implementations, a lane marking captured in an image can have defects or invalid parts due to occlusion, dirt, wear-out etc., which may be difficult to model as a continuous and spatially unlimited parameterized curve. For example, a front-part of an upcoming vehicle or a side pole at road margins can correspond to a parameterized curve, and can thus be wrongly detected as a lane marking.

SUMMARY OF THE INVENTION

Described herein are techniques for an image processing method for improving the performance of a lane classification based on an image of a road.

In accordance with the one example, an image processing method for lane classification comprises: determining a candidate track in an image of a road, wherein the candidate track is modelled as a parameterized line or curve corresponding to a candidate lane marking in the image of a road; dividing the candidate track into a plurality of cells, each cell corresponding to a segment of the candidate track; determining at least one marklet for a plurality of said cells, wherein each marklet of a cell corresponds to a line or curve connecting left and right edges of the candidate lane marking; determining at least one local feature of each of said plurality of cells based on characteristics of said marklets of each respective cell; determining at least one global feature of the candidate track by aggregating the local features of the plurality of cells; and determining if the candidate lane marking represents a lane marking based on the at least one global feature.

Hence, first, a candidate track is determined in an image of a road. The candidate track is modelled as a parameterized line or curve with parameters selected to have the candidate track match a candidate lane marking.

More specifically, the parameters of the candidate track are selected to have the candidate track correspond to a candidate lane marking, wherein the candidate lane marking defines an image pattern in the image of a road resembling a lane marking. For example, a Hough transformation can be used to select parameters of a candidate track modelled as a line or polynomial, such as to detect linear patterns or curves in the image of a road which may correspond to edges or other patterns of a lane marking.

Then, the candidate track is divided into a plurality of cells, wherein each cell corresponds to a segment of the candidate track. Because the candidate track is modelled as a parameterized line or curve, the cells represent line or curve segments of the candidate track, respectively.

Preferably, each cell corresponds to a segment of the candidate track having a fixed length. The length can correspond to the number of pixels covering the length of the cell in a particular direction in the image of a road, for example in the longitudinal direction of the candidate track. Alternatively, the length of each segment can correspond to a fixed length as measured on the road surface. In this example, the length of each cell is selected to correspond to the length of a segment of the candidate track as projected on the surface of the road. The projection on the surface of the road can be performed based on the camera perspective as seen from the vehicle's point of view. In an example, the fixed length of each cell is in the range 10 cm to 5 m, preferably in the range 50 cm to 2 m, further preferred in the range 80 cm to 1.2 m as measured on the road surface.

Marklets are determined for a plurality of said cells, such that each marklet of a cell corresponds to a line or curve connecting left and right edges of the candidate lane marking. For example, a marklet of a cell can be determined as a horizontal row of pixels in the image of a road, providing a linear connection between the left and right edges of the candidate lane marking. Thus, the marklet can describe the horizontal profile of the candidate lane marking, where the candidate lane marking extends in the vertical direction in the image of a road.

Hence, each marklet of a cell provides local information about the cell, more specifically, information about a particular local segment of the candidate lane marking.

Then, at least one local feature of each of the cells is determined based on characteristics of the marklets of the respective cell.

For example, the determined at least one local feature of a cell can include an optical feature of a marklet of the cell, preferably by determining the gradient pattern of gray values of said line or curve of pixels connecting the edges of the candidate lane marking. For example, the respective gradient pattern of gray values can be used to determine the likelihood that the respective pixels connect edges of a candidate lane marking. Hence, the so determined local feature of a cell provides an indication if the candidate lane marking is a true lane marking or not.

Similarly, the at least one local feature of a cell can include a geometric feature of a marklet of the cell, preferably by determining the position of the marklet relative to the candidate track. In other words, the position of the marklet relative to the candidate track can provide an indication if the underlying candidate lane marking is a true lane marking or not. For example, if the position of a marklet is significantly offset relative to the candidate track, the candidate lane marking is less likely to be a true lane marking.

Accordingly, the local features of some of the cells of a candidate track may indicate that the candidate track corresponds to a lane marker, whereas other cells of the candidate track may not confirm this indication. For example, non-confirming cells may correspond to segments of the lane marker which are locally damaged or at least partly occluded by obstacles on the road.

Then, at least one global feature of the candidate track is determined by aggregating the local features of the plurality of cells, and the at least one global feature is used for determining if the candidate lane marking represents a lane marking or not.

For example, the local features of the plurality of cells can be analyzed and/or compared such as to determine an aggregated global feature which can be used for determining if at least a part of a lane marking has been detected in the plurality of cells. Preferably, the aggregation of local features and the following classification based on the respective global feature can be performed using a machine learning classifier, such as for example an artificial neural network receiving the local features as network inputs and providing as a network output the decision if at least a part of a lane marking has been detected or not.

In this way, a robust and efficient image processing method for lane classification is provided which is less sensitive to local variations in the detected lane marking, in particular if the lane marking is locally damaged or partly occluded by obstacles on the road.

Preferably, if it is determined that the candidate lane marking represents a lane marking, the lane marking is classified as a solid line or as a dashed line based on the local features of a plurality of said cells.

For example, if only alternating sets of cells have local features indicating that a lane marking has been detected, the lane marking can be classified as a dashed line.

Preferably, determining at least one local feature of cells can include determining at least one inlier ratio of the cells. For example, the inlier ratio of a cell can be determined as the ratio between the number of marklets determined for the cell and the maximum number of marklets which are determinable for a single cell, for example the number of image pixel lines comprised by the respective cell.

Hence, an inlier ratio close to 1 is likely to indicate that the cell is associated with a solid line lane marking, whereas an inlier ratio close to 0 is likely to indicate that the cell is not associated with a solid line lane marking.

The lane marking can be classified as a solid line or as a dashed line based on the variance of the inlier ratio for consecutive cells of the candidate track. Here, a low variance of the inlier ratio indicates that a consistent line type is being detected in the consecutive cells, for example indicating that a detected lane marking should be classified as a solid line. By contrast, a high variance of the inlier ratio indicates that an inconsistent line type is being detected in the consecutive cells, for example indicating that a detected lane marking should be classified as a dashed line.

Similarly, the lane marking can be classified as a solid line or as a dashed line based on the variance of the inlier ratio of cells captured in consecutive images of the road, preferably for cells positioned in the near range of the vehicle, more specifically, in the near range of the camera carried by the vehicle for capturing the images of the road. If the vehicle is travelling at a sufficient speed, for example at more than 10 m/s, the cells positioned in the near range of the respective camera move along the lane marking and can thus be used to scan the lane marking to perform the lane marking type classification based on consecutive images of the road.

Also in this example, the lane marking can be classified as a solid line or as a dashed line based on the variance of the inlier ratio of cells, such that a line marking corresponding to a small variance of inlier ratio of cells is classified as a solid line, whereas a line marking corresponding to a large variance of inlier ratio of cells is classified as a dashed line.

Preferably, if the above at least one global feature indicates that the candidate lane marking represents a lane marking, the range of the lane marking is determined based on local features of a plurality of cells of the candidate track. In this respect, the range of the lane marking is defined as the non-obstructed length of the lane marking on the image of a road, as viewed from the point of view of the vehicle's camera. Preferably, the range of the lane marking is the non-obstructed spatial length of the lane marking as measured on the road.

Preferably, the range of the lane marking is determined by comparing the at least one local feature of a plurality of cells to a cell model to determine which of the cells match a lane marking segment. For example, the cell model can define a threshold for the inlier ratio of cells defining if a cell should be considered to match a lane marking segment or not.

Preferably, if it is determined that a cell matches a lane marking segment, the length of the lane marking segment is added to the range of the lane marking.

It is preferred that if it is determined that a cell matches a lane marking segment, the at least one local feature of the matching cell is used for updating the cell model, for example to adjust a threshold for the inlier ratio of cells defining if a cell should be considered to match a lane marking segment or not. In this way, the cell model is adapted to follow changing characteristics of the lane marking for improving the classification performance.

In any case, using the at least one global feature to determine if the candidate lane marking represents a lane marking can include performing a classification by a machine learning classifier, such as for example an artificial neural network, or preferably a support vector machine.

Further features and advantages will appear more clearly on a reading of the following detailed description of the preferred embodiment, which is given by way of non-limiting example only and with reference to the accompanying drawings.

BRIEF DESCRIPTION OF DRAWINGS

Further details will now be described, by way of example with reference to the accompanying drawings, in which.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

'One or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for describing embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Figure 1:
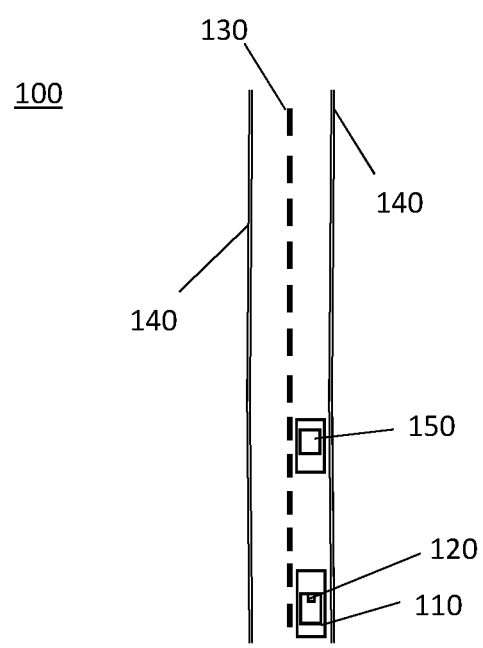
FIG. 1 is a top-down view of a road scenario wherein a vehicle occludes the view of another vehicle.

FIG. 1 shows a top-down view of a road scenario 100 wherein two vehicles 110, 150 are travelling in the same direction. The first vehicle 110 is equipped with a camera 120 and is travelling in the same lane and behind the second vehicle 150.

The camera 120 of the first vehicle 110 is coupled to an image processing system, such as to perform an image processing method for lane classification. In this way, lane markings are identified in camera images to issue a warning if the first vehicle 110 passes a lane boundary 130, 140.

Moreover, the type of lane marking is detected to differentiate between a solid lane marking 140 and a dashed lane marking 130. For example, passing a solid lane marking 140 can be considered more hazardous than passing a dashed lane marking 130 and can thus require a different type of warning. In an example, a warning can be issued when passing a solid lane boundary 140 and omitted when passing a dashed lane boundary 130.

Accordingly, the image of a road provided by the camera 120 is used to detect lane markings 130, 140, identify their type (e.g. solid line or dashed line) and possibly also to determine the valid range of the lane markings such as to provide additional useful information about the vehicle surroundings.

Figure 2:
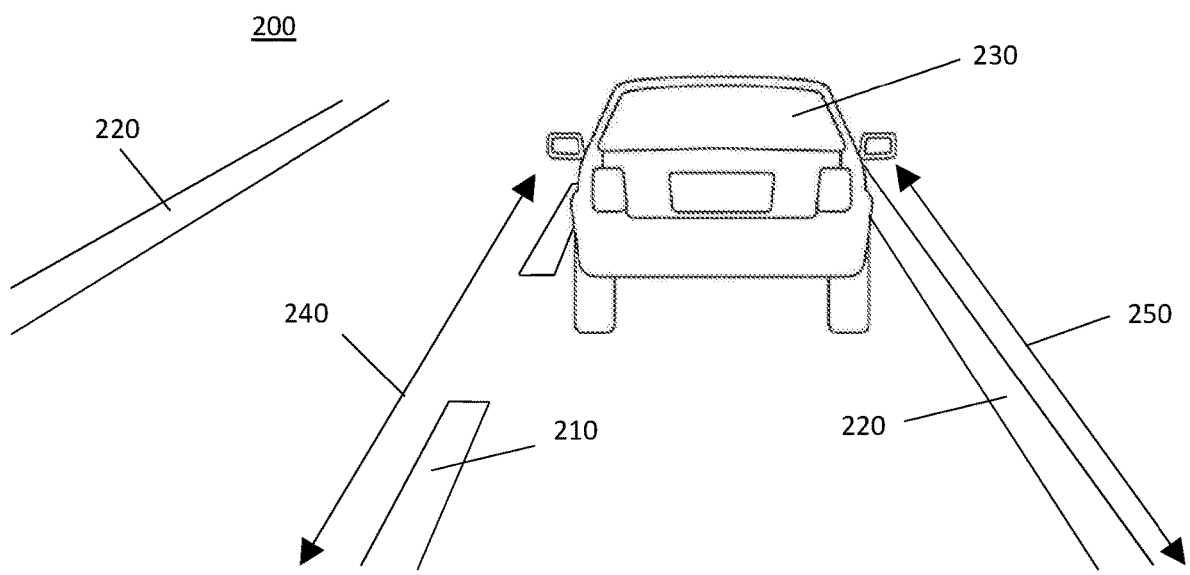
FIG. 2 is a perspective view of a road scenario wherein a vehicle occludes the view of another vehicle.

FIG. 2 shows an image of a road 200 provided by the camera 120 of the first vehicle 110 shown in FIG. 1. The image of a road 200 provides a perspective view of the road scenario 100, as seen from the point of view of the camera 120 of the first vehicle 110. Here, the second vehicle 230 is travelling in the same direction and in the same lane as the first vehicle 110, and thus occludes at least parts of the solid lane markings 220 and the dashed lane marking 210 on the road.

The range 240 shown in FIG. 2 represents the visually perceived length of the dashed lane marking 210, and the range 250 shown in FIG. 2 represents the visually perceived length of the solid lane marking 220 on the right hand side of the image of a road 200.

It follows that the occlusion of lane markings can burden the classification task. Similarly, if a solid line is worn, damaged or occluded by dirt, skid marks or parts of a further vehicle, a lacking connectivity of line segments of a solid line can occur. Thus, it should be avoided that such situations lead to a false classification of a dashed line.

In view of this, a multi-step image processing method for lane classification is proposed. First, a candidate lane marking in the image of a road is classified as a true or false lane marking. For this purpose, a candidate track is determined to corresponds to the candidate lane marking, and local features of the candidate track are then determined and aggregated to derive at least one global feature. Then the at least one global feature is used for determining if the candidate lane marking represents a true lane marking or not.

In this way, the robustness and precision of lane marking classification is significantly improved. More specifically, a lane marking captured in an image can have local defects or invalid parts due to occlusion, dirt, wear-out etc., which may be difficult or impossible to model as a conventional continuous and spatially unlimited parameterized curve. Thus, rather than performing the classification based on a spatially generalized global feature, the present invention proposes to determine local features of a candidate track, wherein the candidate track corresponds to the candidate lane marking, and then to derive a global feature based on the local features.

It follows that the information used for classification is based on a global feature which has been determined based on local features, and thus allows to differentiate between locally occluded or damaged segments or parts of a detected candidate lane marking. In other words, the lane marking classification procedure can differentiate between local segments of the candidate lane marking, and thus allows accounting for local defects or locally occluded parts of a candidate lane marking. Hence, the classification performance can be improved significantly.

Figure 3:
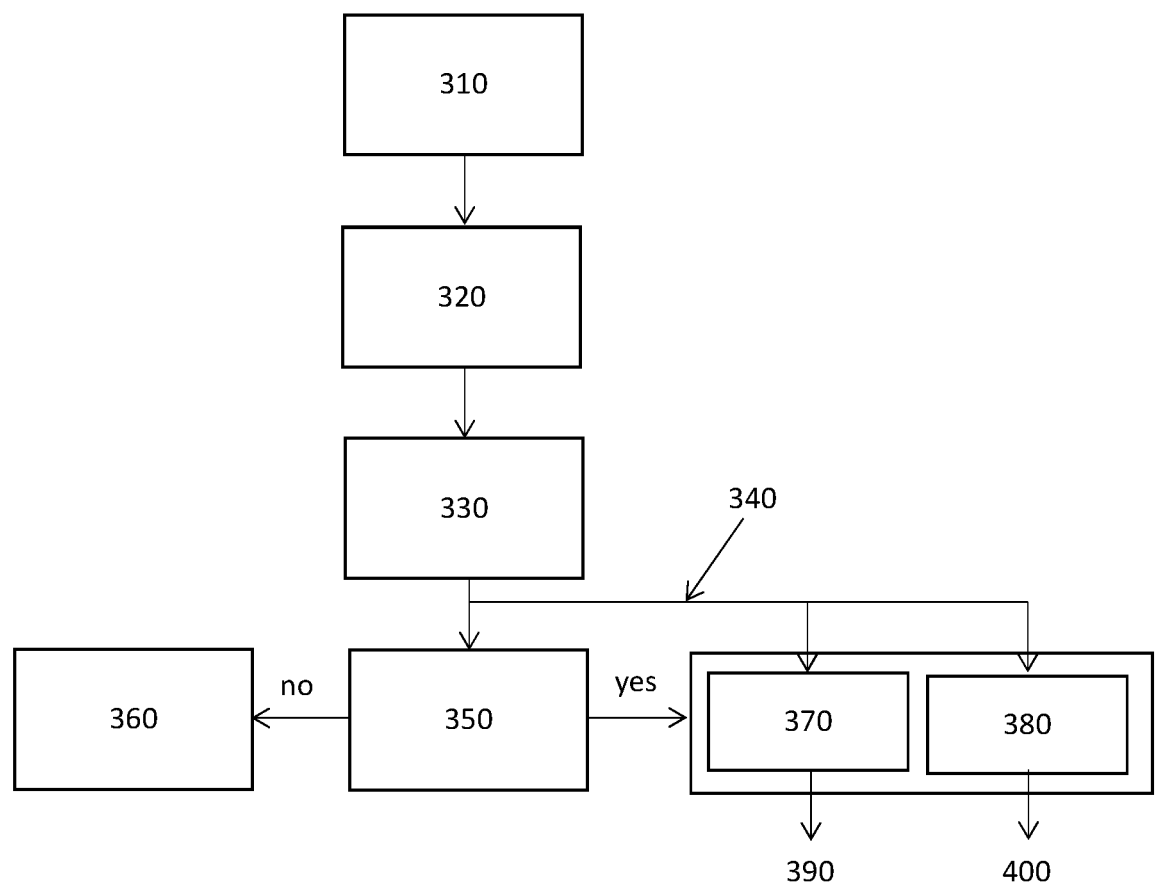
FIG. 3 is a block diagram showing an image processing method for lane classification.

FIG. 3 shows a corresponding block diagram of a proposed image processing method for lane classification 300. In the first step 310, a candidate track is determined in the image of a road, and is modelled as a parameterized line or curve corresponding to a candidate lane marking being the subject of classification. For example, FIG. 4 shows two candidate lane markings 510, 520 in an image of a road 500, wherein two candidate tracks 530, 540 are modelled as parameterized lines such as to correspond to the candidate lane markings 510, 520.

In other words, candidate lane markings 510, 520 are detected in the image of a road 500, for example by edge or pattern recognition algorithms, and corresponding candidate tracks 530, 540 are modelled as lines passing through the candidate lane markings 510, 520.

In order to determine if the respective candidate lane markings 510, 520 represent true or false lane markings on the street surface, their respective candidate tracks 530, 540 are divided into a plurality of cells C1-C7. Hence, in step 310 of FIG. 3 the candidate track is determined and then divided into a plurality of cells, each cell corresponding to a segment of the candidate track.

Figure 4:
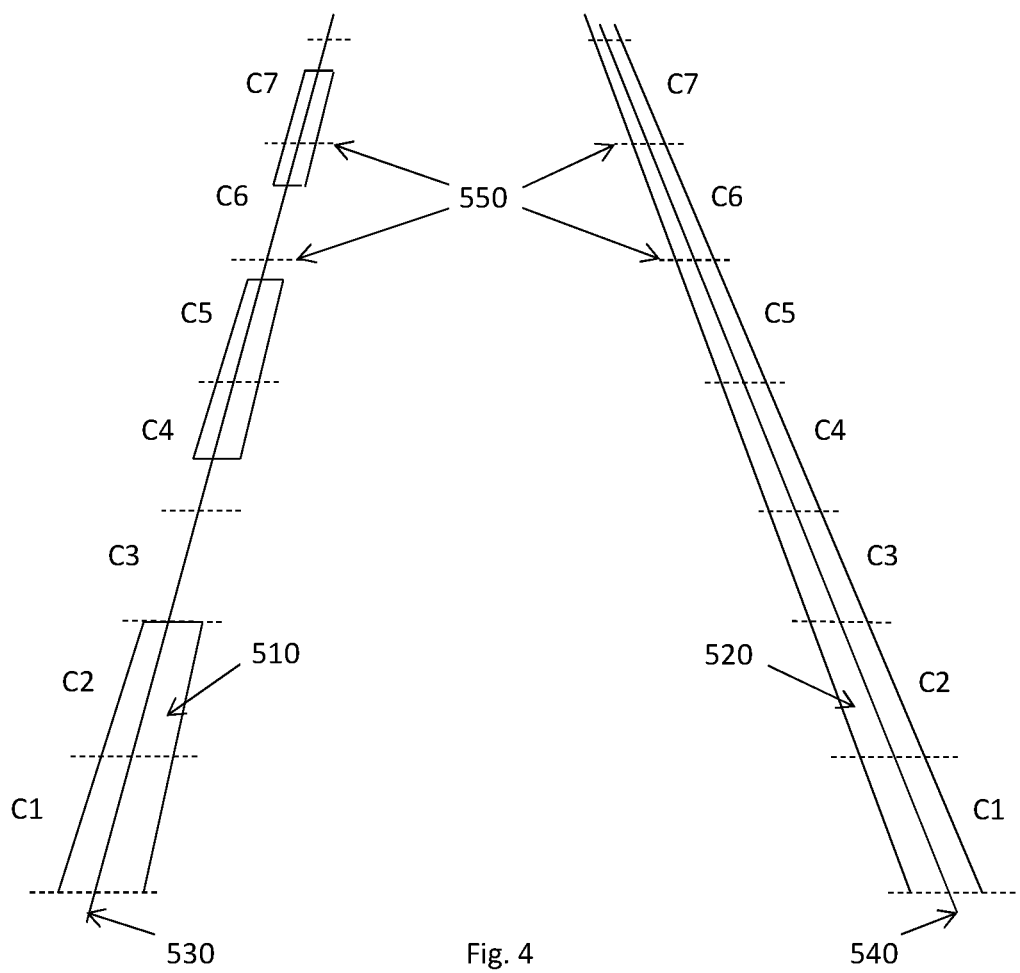
FIG. 4 is a perspective view of a road scenario showing two candidate tracks including a plurality of cells.

In the example shown in FIG. 4, each cell C1-C7 corresponds to a linear segment of the respective candidate track 530, 540. More specifically, the cells C1-C7 are separated at cell margins 550 at approximately equally distributed intervals. In this example, each cell C1-C7 has a fixed length of approximately 1 meter on the surface of the road. However, other lengths and/or unequal length patterns can be selected. For example, the length of cells can be tuned large enough to collect sufficient information for enhancing the cell's robustness against local noise, whereas shortening the length of cells improves the spatial resolution provided by the lane marking classification.

In step 320 of FIG. 3 at least one marklet is determined for a plurality of the cells. Here, each marklet of a cell corresponds to a line or curve connecting left and right edges of the candidate lane marking.

Figure 5:
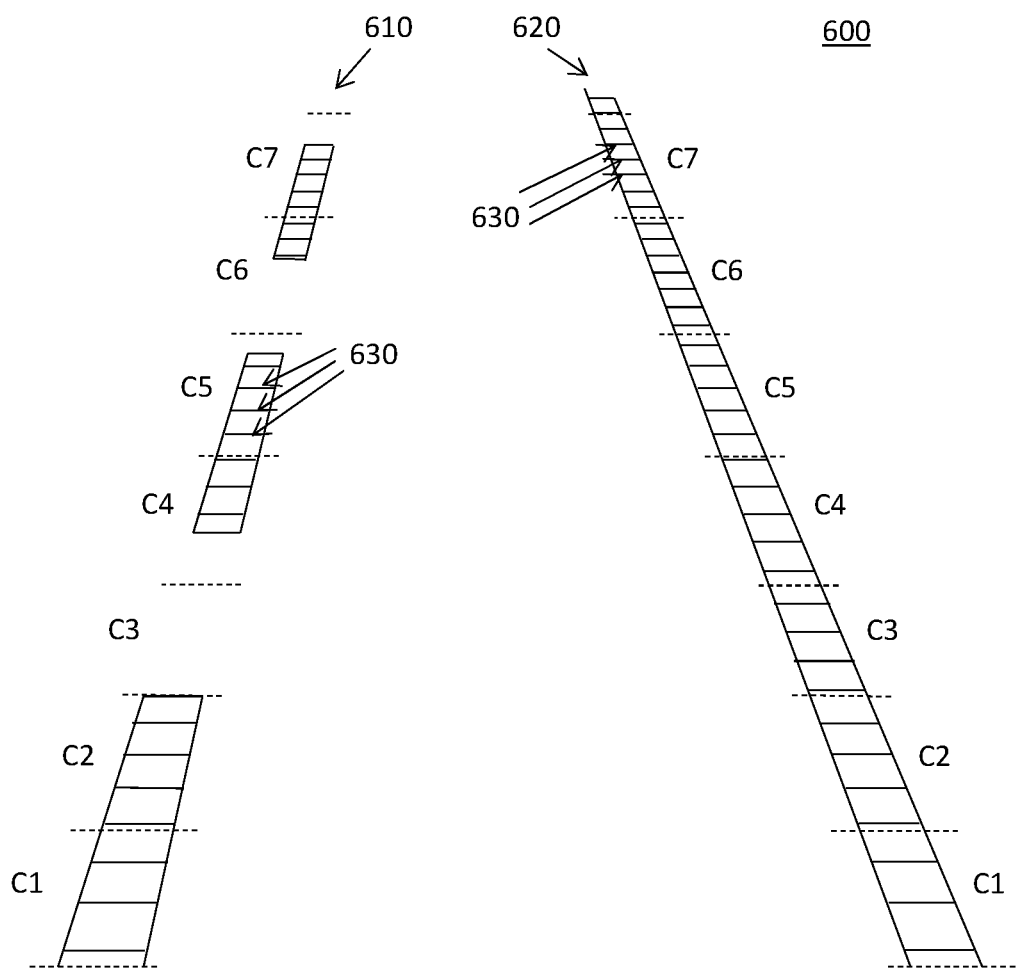
FIG. 5 is the road scenario of FIG. 4 further illustrating the marklets of cells.

For example, the road scenario 600 shown in FIG. 5 corresponds to the image of a road 500 of FIG. 4 and further illustrates the arrangement of marklets 630 in the cells C1-C7. In this example, each marklet 630 represents a line connecting the left and right edges of the candidate lane markings 610, 620, and the marklets are distributed in a direction extending along the candidate lane markings 610, 620. It follows that the number of marklets 630 determined for the solid candidate lane marking 620 exceeds the number of marklets 630 determined for the dashed candidate lane marking 630.

In the next step 330 shown in FIG. 3, at least one local feature 340 of each of said plurality of cells C1-C7 is determined based on characteristics of the marklets 630.

In this example, characteristics of the marklets 630 are used to determine both optical and geometric features for each of their respective cells C1-C7.

More specifically, the optical local features of a cell C1-C7 are determined by analyzing the gradient pattern of the gray values of pixels corresponding to the respective linear marklet 630 connecting the edges of the candidate lane marking 610, 620. In this example, the gradient patterns of gray values is used to determine the likelihood that the respective pixels connect edges of a candidate lane marking, and thus to provide an indication if the respective cell C1-C7 is truly associated with a lane marking or not.

Similarly, geometric features of the marklets 630 of cells C1-C7 are determined by analysing the position of each marklet 630 relative to its associated candidate track 530, 540. In other words, the position of a marklet 630 relative to its candidate track 530, 540 provides an indication if the respective cell C1-C7 is truly associated with a lane marking or not. For example, if the positions of marklets 630 of a cell C1-C7 are significantly offset relative to its candidate track 530, 540, the respective cell is unlikely to be associated with a true lane marking.

Accordingly, the local features of the cells C1-C7 of a candidate track 630, 540 provide an indication if the candidate track 630, 640 corresponds to a true lane marker. However, non-confirming cells C1-C7 may correspond to segments of the lane marker which are missing in a dashed line, locally damaged or at least partly occluded by obstacles on the road.

In view of this, in step 350 of FIG. 3, at least one global feature of a candidate track 530, 540 is determined by aggregating the local features of the plurality of cells C1-C7 associated with the respective candidate track 530, 540, and the at least one global feature is then used for determining if the candidate lane marking, associated with the candidate track 530, 540, represents a true lane marking or not.

In this example, the local features of the cells of a candidate track 530, 540 are analyzed to determine an aggregated global feature which can be used for determining if at least a part of a lane marking has been detected in the plurality of cells. For this purpose, the aggregation of local features and the following classification based on the respective global feature is performed using a machine learning classifier, such as for example a Support Vector Machine (SVM).

For example, if the underlying candidate lane marking is locally damaged and/or partly occluded by obstacles on the road, the local features of some of its cells C1-C7 may indicate that the underlying candidate track 530, 540 corresponds to a true lane marking, whereas the local features of the remaining cells C1-C7 may not confirm this indication. Thus, by aggregating the local features to generate a global feature used for classification, it becomes possible to differentiate between spatially separated parts of the candidate lane marking 610, 620. In other words, even if the candidate lane marking 610, 620 is partly damaged, occluded or represents a dashed line, the cells of the candidate lane marking which are unaffected by the damage, obstruction or dashed line type allow locally detecting the presence of the lane marking, improving the robustness and efficiency of the lane marking classification method.

If it is determined in step 350 of FIG. 3 that the candidate lane marking does not correspond to a true lane marking, the method proceeds to step 360 to terminate the lane marking classification for that particular candidate lane marking.

Alternatively, if it is determined in step 350 of FIG. 3 that the candidate lane marking does corresponds to a true lane marking, the method proceeds to step 370 to determine the type of the detected lane marking, and to step 380 to determine the range of the detected lane marking.

More specifically, in step 370 of FIG. 3, the candidate lane marking 610, 620 corresponding to the candidate track 530, 540 is classified as a solid line or as a dashed line based on the local features of a plurality of said cells C1-C7. For example, as shown in FIG. 5, if only alternating sets of cells C1-C7 have local features indicating that a lane marking has been detected, the lane marking can be classified as a dashed line.

Moreover, in step 330 of FIG. 3, at least one local feature of cells C1-C7 is determined by analyzing the inlier ratio of each cell. In this example, the inlier ratio of a cell C1-C7 is determined as the ratio between the number of marklets 630 determined for the cell C1-C7 and the number of image pixel lines comprised by the respective cell C1-C7.

As shown in FIG. 5, an inlier ratio close to 1 indicates that the respective cell has detected the highest possible number of marklets 630 connecting left and right edges of a lane marking, indicating that the cell C1-C7 is associated with a solid line, whereas an inlier ratio close to 0 indicates that the cell C1-C7 is not associated with a solid line, but could be associated with a gap cell in a dashed lane marking.

It follows that the lane marking can be classified as a solid line or as a dashed line based on the variance of the inlier ratio for consecutive cells C1-C7 of the candidate track 530, 540. Here, a low variance of the inlier ratio indicates that a consistent line type is being detected in the consecutive cells C1-C7, for example indicating that a detected true lane marking should be classified in step 370 as a solid line. By contrast, a high variance of the inlier ratio indicates that an inconsistent line type is being detected in the consecutive cells, for example indicating that a detected lane marking should be classified in step 370 as a dashed line.

Alternatively, rather than using the variance of the inlier ratio for consecutive cells C1-C7 of the candidate track 530, 540, the difference between the minimum and maximum values of the inlier ratio can be selected to characterize the corresponding lane marking. Generally, this difference should be larger for a dashed lane marking than for a solid lane marking.

Similarly, step 370 in FIG. 3 can perform the lane marking type classification based on the variance of the inlier ratio of cells captured in consecutive images of the road, preferably for cells positioned in the near range of the vehicle, for example in the range of cells C1 and/or C2 shown in FIG. 5. Thus, if the vehicle is travelling at a sufficient speed, for example at more than 10 m/s, the near range cells C1 and/or C2 move along the lane marking. In this way, the near range cells C1 and/or C2 scan the respective lane marking for performing the lane marking type classification based on consecutive images of the road 600.

In any case, the result of classification as a solid line or dashed line is provided in FIG. 3 as the result of lane marking type classification 390.

In step 380 of FIG. 3, the range of the detected lane marking is determined based on the local features 340 of the cells C1-C7. The range 240, 250 is defined in FIG. 2 as the non-obstructed length of the lane marking 210, 220 as viewed from the point of view of the vehicle's camera. For example, the range 210, 220 can correspond to the non-obstructed spatial length of the lane marking as measured on the road surface.

In this example, the range 240, 250 is determined by comparing the at least one local feature of a plurality of cells C1-C7 to a cell model to determine which of the cells C1-C7 match a valid lane marking segment. For example, the cell model can define a threshold for the inlier ratio of cells C1-C7 defining if a cell should be considered to match a lane marking segment or not.

For example, if the local features of cell C1 satisfies the cell model and thus matches a lane marking segment, the range includes the length of the cell C1. Then, if it is determined that cell C2 also matches a lane marking segment, the length of cell C2 is added to the range of the lane marking. For a solid line lane marking, this can be repeated until the nearest cell fails to match a lane marking segment.

In this way, cells can be checked from the near to far region of the image of a road 200 such as to determine the range of the detected lane marking. It follows that both optical and geometric features of cells C1-C7 can be checked to determine if a cell is part of a valid lane marking or not.

For example, during optical checking the similarity between a cell and a cell model is calculated. For this purpose the model is initially built from several cells in near range (e.g. within 5 meters as measured on the surface of a road). If the similarity is sufficient, then the cell is considered valid, otherwise it is considered invalid.

During geometric checking the position and width deviation between a cell and a candidate track is calculated, wherein the position and/or width of the cell can be defined as local features of the cell based on the positions and/or widths of marklets of the cell. A large deviation can occur for invalid cells (e.g. for poles close to road margins), and other geometric characteristics, such as for example the width of the cell, can be different from that of a lane marking. Thus, for example, a large deviation of a cell from a candidate track results in the cell being considered invalid, whereas the cell is considered valid for a small deviation, if the cell's width corresponds to a lane marking width.

After the respective cells have been checked, the valid range estimation result 400 is provided in FIG. 3 by determining the length to the last valid cell along the lane marking, for example by using the above approach of scanning cells from the near to far region of the image of a road 200.

For a dashed lane marking, additional criteria can be used for validity checking the range, for example by making use of the intuition that the alternating marking length and gap length of a dashed lane marking is well defined and fixed.

In an example, if a cell in far range is being checked, the optical and geometric features are validated based on less strict criteria than in the near field, for example to account for image blurring and lower pixel resolution in the image far-field.

In any case, if a cell is considered to satisfy the matching criteria provided by a cell model, then the cell model can be updated according to characteristics of the checked cell. For example, if it is determined that a cell matches a lane marking segment, the at least one local feature of the cell can be used for updating the cell model, for example to adjust a threshold for the inlier ratio of cells defining if a cell should be considered to match a lane marking segment or not. In this way, the cell model is adapted to follow changing characteristics of the lane marking for improving the classification performance.

In an example, using the at least one global feature to determine if the candidate lane marking represents a lane marking can include performing a classification by a machine learning classifier, such as for example an artificial neural network, preferably by a support vector machine.

While this invention has been described in terms of the preferred embodiments thereof, it is not intended to be so limited, but rather only to the extent set forth in the claims that follow.

We claim:

1. An image processing method for lane classification, said method comprising:
   determining a candidate track in an image of a road, wherein the candidate track is modelled as a parameterized line or curve corresponding to a candidate lane marking in the image of a road;

dividing the candidate track into a plurality of cells, each cell corresponding to a segment of the candidate track;

determining at least one marklet for a plurality of said cells, wherein each marklet of a cell corresponds to a line or curve connecting left and right edges of the candidate lane marking;

determining at least one local feature of each of said plurality of cells based on characteristics of said marklets of each respective cell by determining at least one inlier ratio of at least one of the cells as the ratio between a number of marklets determined for the cell and a number of image pixel lines comprised by the cell;

determining at least one global feature of the candidate track by aggregating the local features of the plurality of cells;

determining if the candidate lane marking represents a lane marking based on the at least one global feature;

classifying, if it is determined that the candidate lane marking represents a lane marking, the lane marking as a solid line or as a dashed based on the local features of a plurality of said cells including the at least one inlier ratio.

2. The image processing method of claim 1, wherein each marklet of a cell is defined by a horizontal row of pixels of said image of a road connecting left and right edges of the candidate lane marking extending in the vertical direction in the image of a road.

3. The image processing method of claim 1, wherein said determining at least one local feature includes determining an optical feature of a marklet of a cell by determining the gradient pattern of gray values of a line or curve of pixels of the candidate lane marking corresponding to the marklet.

4. The image processing method of claim 1, wherein said determining at least one local feature includes determining a geometric feature of a marklet of a cell by determining the position of the marklet relative to the candidate track.

5. The image processing method of claim 1, wherein the candidate track is divided into a plurality of cells such that each cell corresponds to a segment of the candidate track having a fixed length, wherein the length of each segment corresponds to a fixed length as measured on the road surface.

6. The image processing method of claim 5, wherein the fixed length of each cell is in the range 10 cm to 5 m.

7. The image processing method of claim 1, wherein the lane marking is classified as a solid line or as a dashed line based on the variance of the inlier ratio for consecutive cells of the candidate track.

8. The image processing method of claim 1, wherein the lane marking is classified as a solid line or as a dashed line based on the variance of the inlier ratio of cells captured in consecutive images of the road for cells positioned in the near range of the respective camera used for capturing the images of the road.

9. The image processing method of claim 7, wherein the lane marking is classified as a solid line or as a dashed line based on the variance of the inlier ratio of cells, such that a line marking classified as a solid line has a smaller variance of inlier ratio of cells than that of a line marking classified as a dashed line.

10. The image processing method of claim 1, wherein if it is determined that the candidate lane marking represents a lane marking, a range of the lane marking is determined based on the local features of a plurality of said cells, wherein the range of the lane marking corresponds to the non-obstructed length of the lane marking.

11. The image processing method of claim 10, wherein the range of the lane marking is determined by comparing the at least one local feature of a plurality of cells to a cell model to determine which of the cells match a lane marking segment.

12. The image processing method of claim 11, wherein if it is determined that a cell matches a lane marking segment, the length of the segment of the candidate track corresponding to the cell is added to the range of the lane marking, and the at least one local feature of the cell is used for updating the cell model.

13. The image processing method of claim 1, wherein determining if the candidate lane marking represents a lane marking based on the at least one global feature includes performing a classification using a machine learning classifier, an artificial neural network, or a support vector machine.

14. A system comprising:

means for determining a candidate track in an image of a road, wherein the candidate track is modelled as a parameterized line or curve corresponding to a candidate lane marking in the image of a road;

means for dividing the candidate track into a plurality of cells, each cell corresponding to a segment of the candidate track;

means for determining at least one marklet for a plurality of said cells, wherein each marklet of a cell corresponds to a line or curve connecting left and right edges of the candidate lane marking;

means for determining at least one local feature of each of said plurality of cells based on characteristics of said marklets of each respective cell including means for determining at least one inlier ratio of at least one of the cells as the ratio between a number of marklets determined for the cell and a number of image pixel lines comprised by the cell;

means for determining at least one global feature of the candidate track by aggregating the local features of the plurality of cells; and means for determining if the candidate lane marking represents a lane marking based on the at least one global feature, wherein if it is determined that the candidate lane marking represents a lane marking, further comprising means for classifying the lane marking as a solid line or as a dashed based on the local features of a plurality of said cells including the at least one inlier ratio.

15. A system comprising a processor configured to:

determine a candidate track in an image of a road, wherein the candidate track is modelled as a parameterized line or curve corresponding to a candidate lane marking in the image of a road;

divide the candidate track into a plurality of cells, each cell corresponding to a segment of the candidate track;

determine at least one marklet for a plurality of said cells, wherein each marklet of a cell corresponds to a line or curve connecting left and right edges of the candidate lane marking;

determine at least one local feature of each of said plurality of cells based on characteristics of said marklets of each respective cell by determining at least one inlier ratio of at least one of the cells as the ratio between a number of marklets determined for the cell and a number of image pixel lines comprised by the cell;

determine at least one global feature of the candidate track by aggregating the local features of the plurality of cells;

determine if the candidate lane marking represents a lane marking based on the at least one global feature; and classify, if it is determined that the candidate lane marking represents a lane marking, the lane marking as a solid line or as a dashed based on the local features of a plurality of said cells including the at least one inlier ratio.

16. The system of claim 15, wherein each marklet of a cell is defined by a horizontal row of pixels of said image of a road connecting left and right edges of the candidate lane marking extending in the vertical direction in the image of a road.

17. The system of claim 15, wherein the processor is further configured to determine the at least one local feature by determining an optical feature of a marklet of a cell by determining the gradient pattern of gray values of a line or curve of pixels of the candidate lane marking corresponding to the marklet.

18. The system of claim 15, wherein the processor is further configured to determine the at least one local feature by determining a geometric feature of a marklet of a cell by determining the position of the marklet relative to the candidate track.

19. The system of claim 15, wherein the candidate track is divided into a plurality of cells such that each cell corresponds to a segment of the candidate track having a fixed length, wherein the length of each segment corresponds to a fixed length as measured on the road surface.

20. The system of claim 19, wherein the fixed length of each cell is in the range 10 cm to 5 m.

* * * * *